No. 811,646. PATENTED FEB. 6, 1906.
J. H. LORIMER.
VEHICLE WHEEL TIRE.
APPLICATION FILED APR. 15, 1905.
Fig. 1.
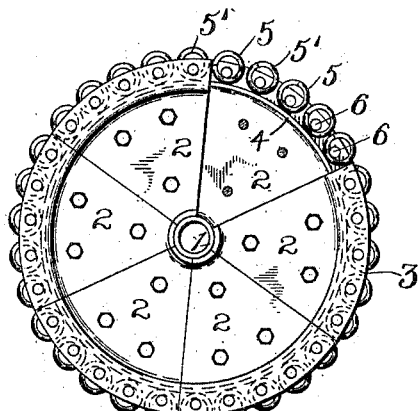
Fig. 2.
Fig. 3.
Fig. 5.
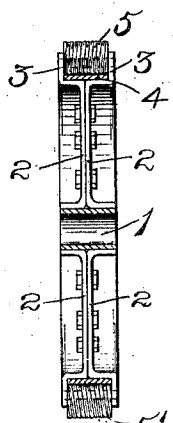
Fig. 4.
Witnesses
Chas. O. Peard
R. H. Allyn
Inventor
John H. Lorimer
By his Attorneys

UNITED STATES PATENT OFFICE.

JOHN H. LORIMER, OF PHILADELPHIA, PENNSYLVANIA.

VEHICLE-WHEEL TIRE.

No. 811,646.　　　Specification of Letters Patent.　　　Patented Feb. 6, 1906.

Application filed April 15, 1905. Serial No. 255,683.

*To all whom it may concern:*

Be it known that I, JOHN H. LORIMER, a citizen of the United States, residing at Philadelphia, Pennsylvania, have invented certain new and useful Improvements in Vehicle-Wheel Tires, of which the following is a full, clear, and exact description.

My invention relates to vehicle-wheel tires, and particularly for heavy vehicles.

The object of the invention is to construct a simple wheel of great strength with a resilient tire which will withstand severe usage and yet which may be readily repaired.

The invention may be said briefly to consist in a wheel having a suitable hub and spokes or spoke construction and a felly with transverse spiral-spring tread units, as set forth in principle in the accompanying single sheet of drawings and the following specification.

Figure 1 is a side view or elevation of a wheel and tire embodying the improvements of my invention, a portion of the same being removed to show the tread units more clearly. Fig. 2 is a plan or edge view of the wheel, showing only a portion of the tread units in place. Fig. 3 is a vertical section of the wheel. Fig. 4 is a detail of one of the spiral-spring tread units detached and expanded. Fig. 5 is a detail end view of a modified unit.

The hub and spokes may be of any suitable construction for carrying out my invention. The materials employed will vary with the design and desire of the manufacturer, the drawings simply showing one form of construction as illustrative of the principles of the invention.

1 indicates the hub.

2 2 indicate the spokes of the wheel, which in the form herein shown are composed of sheet-metal plates suitably riveted or bolted together. The spokes may, however, be formed integral or continuous for each side of the wheel.

3 3 indicate annular flanges continuous around the circumference of the wheel on both sides.

4 indicates a band or ring affording a continuous seat around the circumference of the wheel between the walls of the flanges.

5 5 are spiral-spring tread units seated in the groove between the flanges and preferably compressed from the size shown in Fig. 4 to approximately that shown in the other figures. 5' 5' are other spiral-spring tread units which are preferably formed with a reverse turn, the two different forms of springs being arranged alternately in the wheel so as to offset any tendency which the tread units might have to permit the wheel to cant or skid in one direction or the other.

6 6 are bolts or pins which are passed through the two flanges 3 3 for holding the tread units in place. The springs are arranged so closely together as to prevent loose play in travel.

When any of the springs become damaged, these may be readily removed by simply knocking out the proper pins and new ones replaced.

The advantages of this construction are its simplicity, resiliency, durability, and adaptability to quick repair. The size of the springs and the temper and strength, as well as the size of the wheels, will of course be varied as necessary. Each tread unit may be embedded in a suitable composition, such as soft rubber, as shown at 7 in Fig. 5, if desired, which for certain classes of work may be advantageous.

What I claim is—

1. In a vehicle-wheel, a supporting-ring, a pair of flanges, and a series of independent transversely-arranged spiral-spring tread units.

2. A vehicle-wheel comprising a hub, spokes, a rim, and a series of independently-removable transversely-arranged spiral-spring tread units.

3. In a vehicle-wheel, a rim and a series of independent alternately-reversed transversely-arranged spiral-spring tread units.

JOHN H. LORIMER.

Witnesses:
　L. VREELAND,
　ROBT. S. ALLYN.